(12) United States Patent
Ellwanger

(10) Patent No.: US 12,264,013 B2
(45) Date of Patent: Apr. 1, 2025

(54) DEVICE FOR INDICATING STORED GOODS AND A STORAGE RACK WITH SUCH A DEVICE

(71) Applicant: Hänel GmbH & Co. KG, Bad Friedrichshall (DE)

(72) Inventor: Harald Ellwanger, Neuenstadt (DE)

(73) Assignee: Hanel GmbH & Co. KG, Bad Friedrichshall (DE)

( * ) Notice: Subject to any disclaimer, the term of this patent is extended or adjusted under 35 U.S.C. 154(b) by 0 days.

(21) Appl. No.: 18/275,568

(22) PCT Filed: Mar. 8, 2022

(86) PCT No.: PCT/EP2022/055908
§ 371 (c)(1),
(2) Date: Aug. 2, 2023

(87) PCT Pub. No.: WO2022/207255
PCT Pub. Date: Oct. 6, 2022

(65) Prior Publication Data
US 2024/0083675 A1 Mar. 14, 2024

(30) Foreign Application Priority Data
Mar. 29, 2021 (DE) .......................... 102021107890.3

(51) Int. Cl.
*B65G 1/137* (2006.01)
*A47F 11/10* (2006.01)
*B65G 1/06* (2006.01)

(52) U.S. Cl.
CPC ............ *B65G 1/1373* (2013.01); *A47F 11/10* (2013.01); *B65G 1/06* (2013.01)

(58) Field of Classification Search
CPC .......... B65G 1/1373; B65G 1/06; A47F 11/10
See application file for complete search history.

(56) References Cited

U.S. PATENT DOCUMENTS 8,463,425 B2 * 6/2013 Hanel ................... B65G 1/137
700/215

FOREIGN PATENT DOCUMENTS

| DE | 102012016552 A1 | 2/2014 |
| DE | 202018002291 U1 * | 7/2018 |
| DE | 102018221074 A1 | 6/2020 |
| DE | 102019118046 A1 | 1/2021 |
| EP | 2554496 A1 | 2/2013 |

* cited by examiner

*Primary Examiner* — Joseph L Williams
(74) *Attorney, Agent, or Firm* — Timothy W. Menasco, Esq.; Harter Secrest & Emery, LLP

(57) ABSTRACT

The invention relates to a device (10) for indicating stored goods (102), particularly for an automated storage rack (100), which comprises at least one lighting device (12) with a plurality of separately controllable lighting elements (14). The lighting device (12) is configured in a bar-shaped manner, has a plurality of lighting elements (14) which are arranged with an offset from one another in a row (16) along the bar-shaped lighting device (12) and are orientated substantially vertically downwards. The lighting device (12) extends in a first horizontal direction (y) and can be moved in a second horizontal direction (x).

15 Claims, 4 Drawing Sheets

DEVICE FOR INDICATING STORED GOODS AND A STORAGE RACK WITH SUCH A DEVICE

The invention relates to a device for indicating stored goods, particularly for an automated storage rack, comprising at least one lighting device with a plurality of separately controllable lighting elements. The invention further relates to a storage rack with such a device.

Such indicating devices for a storage rack are known and serve for quickly and efficiently locating the desired stored goods placed on a stored goods carrier. This is advantageous particularly when an operator order-picks various stored goods. Usually, a stored goods carrier for such a storage rack is transported, for loading and removal, into a service opening by means of an automated transport device.

A storage rack having an indicating device with a plurality of separately controllable lighting elements on an upper side of a service opening is disclosed in DE 10 2007 004 866 A1. These lighting elements are uniformly distributed across the entire upper side and firmly integrated into the upper side of the service opening.

Moreover, it is known to provide a storage rack with an indicating device firmly attached to the upper side. Such a storage rack is known from EP 3172152 A1, for instance. An indicating device firmly incorporated at only one location of the upper side is capable of marking stored goods in only a limited manner in the area of the edge of the stored goods carrier. Because in the case of wide stored goods carriers, the light beam for marking stored goods located in the area of the edge, emanating from a centrally fixed indicating device, extends at a shallow angle. Consequently, smaller stored goods are concealed by larger stored goods deposited in front of the smaller stored goods.

A storage rack having upright light strips firmly mounted on the side wall of a service opening of a storage rack is disclosed in DE 299 05 396 U1. However, this indicating device is suitable only for the case of narrow service openings. Because only the depth at which the stored goods are located can be indicated. An exact position of the stored goods, particularly of centrally arranged stored goods, cannot be indicated exactly using such a system.

On this basis, the invention is based on the object of creating an improved indicating device that has a simple structure and is inexpensive. In order to achieve this object, a device for indicating stored goods according to claim 1 and a storage rack according to claim 10 are proposed. Advantageous embodiments are the subject matter of the respectively dependent claims.

The indicating device according to the invention is characterized by a lighting device that is configured in a bar-shaped manner and has a plurality of lighting elements, which are arranged with an offset from one another in a row along the bar-shaped lighting device. Moreover, the lighting device is characterized in that the lighting elements are orientated substantially vertically downwards. Moreover, the bar-shaped lighting device extends in a first horizontal direction and can be moved in a second horizontal direction.

Advantageously, the bar-shaped lighting device extends across the entire stored goods carrier in the first horizontal direction, and can be moved across the entire stored goods carrier along the second horizontal direction, so that stored goods may be indicated on the entire stored goods carrier. Advantageously, the first horizontal direction extends along the depth of a service opening, and the second horizontal direction along the width of the service opening of the storage rack. However, a reverse arrangement would also be conceivable.

Since the indicating device according to the invention can be moved only in a horizontal direction and has a plurality of separately controllable lighting elements in the second horizontal direction, the indicating device according to the invention is characterized by a simple and inexpensive construction. In contrast to a known indicating device, which can be moved in both the first horizontal direction and the second horizontal direction, the indicating device according to the invention requires a driving means only along one horizontal direction.

Moreover, the plurality of separately controllable lighting elements makes it possible for several storage locations to be indicated simultaneously. Furthermore, it is particularly easy to retrofit an existing service opening of a storage rack with the indicating device according to the invention.

The indicating device according to the invention has a flat structure. For this purpose, the bar-shaped lighting device includes an LED strip or an LED bar, for example, having light-emitting diodes (LEDs) as lighting elements. Furthermore, it would also be conceivable to provide a carrier member on which a plurality of separately controllable lighting elements is arranged substantially along a row. The flat structure has the effect that only little construction space is taken up by the indicating device in the service opening.

A storage rack is to be understood to be a vertical lift or a small parts storage system.

Advantageously, the lighting elements are configured as light-emitting diodes (LED) or laser pointers. Light-emitting diodes are particularly suitable because they require only very little construction space and have a flat configuration. Moreover, light-emitting diodes are particularly energy-efficient and produce little heat.

Advantageously, the lighting elements may be individually controllable, or in groups.

Furthermore, advantageously, the lighting elements are suitable for emitting light in different colors. In addition to spatially indicating a storage location, information on the prioritization with respect to other jobs that are indicated at the same time may thus be communicated to an operator of the storage rack. For example, the stored goods to be removed from storage first are marked with a red color, wherein the subsequent stored goods are indicated with a different color, such as blue or green, for example. Moreover, it may be provided that, in the case of several stored articles stored one behind the other, the desired stored article is indicated with "green", and the stored articles situated to the front and the rear thereof in space are indicated with "red". In another advantageous embodiment, it may also be indicated in different colors if the stock drops below a minimum level. Advantageously, the lighting elements are arranged in at least three rows extending side-by-side. By means of at least three rows extending side-by side, it is possible to form a border around stored goods or highlight them more clearly by means of a cross. More than three rows permit a more detailed or larger border or cross, so that the stored goods are highlighted more clearly.

Advantageously, the lighting device is guided on at least one rail and can be moved along the rail. Rails are particularly suitable due to the fact that they permit a precise approach to the position along the second horizontal direction. This also includes embodiments with two or more rails. Particularly in the case of two or more rails, a particularly firm connection is ensured for particularly long bar-shaped lighting elements. For this purpose, the rails advantageously run at least in the respective opposite area of the edge of the lighting device extending in the first horizontal direction.

In an advantageous embodiment, only a single rail is provided on which the lighting device is arranged centrally. Particularly compared to two or more rails, this is characterized by a simple and rapid installation in the service opening of the storage rack.

Advantageously, a controllable drive unit is assigned to the lighting device. A drive unit is to be understood to be an electric actuator with a worm gear or a gearwheel, for example.

In another advantageous embodiment, the indicating device has multiple bar-shaped lighting devices that can be controlled separately. The lighting devices are arranged parallel next to one another, distributed along the second horizontal direction and so as to be movable. Thus, in the case of particularly wide service openings, a position to be indicated can be approached quickly on the one hand, or on the other hand, several storage locations along the second horizontal direction may be indicated on the stored goods carrier to one or several operators, by different colors or different indicating patterns, for example.

Advantageously, the lighting device has a camera. Pictures of the stored goods located on the stored goods carrier may be taken by means of the camera. These pictures may be used for stock-taking and stored by a warehouse management system, for example.

In an advantageous embodiment, the storage rack according to the invention has a plurality of carrier supports disposed one above the other for supporting stored goods carriers, and at least one service opening for delivering and retrieving the stored goods carriers. Furthermore, the stored goods carriers can be transported by means of an automatic transport device. Such a storage rack is referred to as a vertical lift.

Advantageously, the indicating device is arranged on an upper side of the service opening of the storage rack. This is to be understood to mean that the indicating device is located in the upper region of the service opening. Thus, it is possible to indicate stored goods located on the stored goods carrier from above.

Advantageously, at least two spaced-apart rack towers are provided, each of which has a plurality of carrier supports for supporting the stored goods carriers, and that the automatic transport device is disposed between the rack towers.

Advantageously, the first horizontal direction extends along the depth, and the second horizontal direction along the width, of the service opening.

The invention is explained in more detail below with reference to exemplary embodiments that are schematically shown in the Figures. In the Figures.

Figure 1:
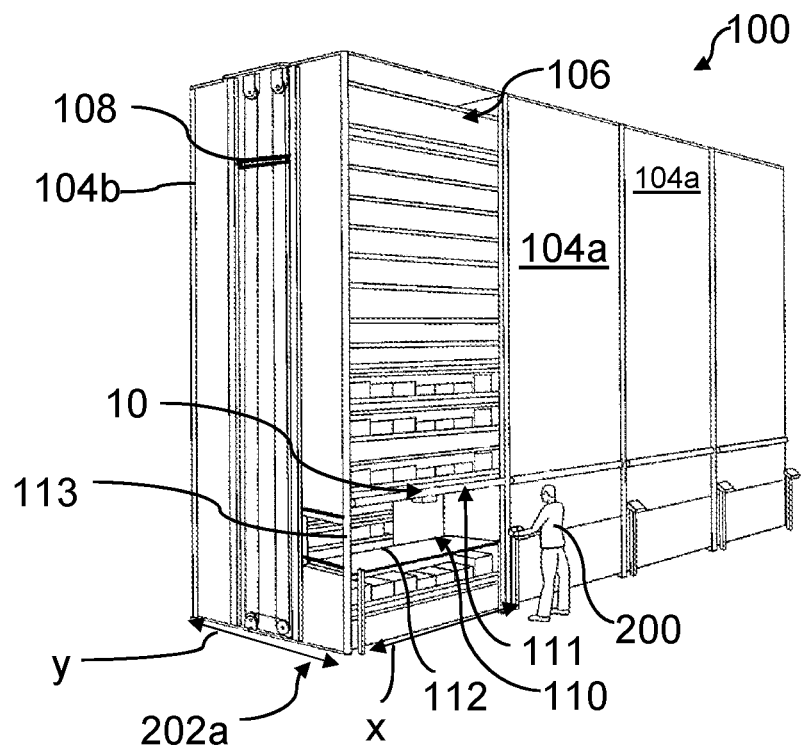
FIG. 1 shows a perspective view of a storage rack according to the invention.
Figure 2:
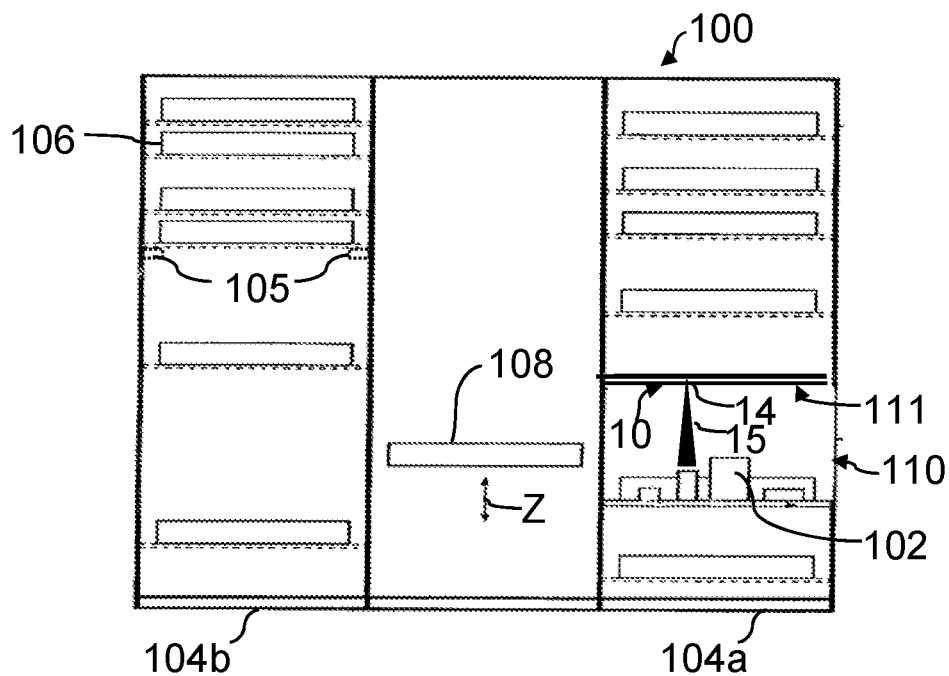
FIG. 2 shows a vertical section through the storage rack according to the invention of FIG. 1 in the region of the service opening.

FIGS. 1 and 2 show an automated storage rack 100 configured as a vertical lift. The storage rack 100 has two spaced-apart rack towers 104a, 104b with a plurality of carrier supports 105 disposed one above the other for supporting stored goods carriers 106. An automatic transport device 108 is movably disposed between the spaced-apart rack towers 104a, 104b. By means of the automatic transport device 108, the stored goods carriers 106 can be moved to a service opening 110 for delivering and removing stored goods 102. The service opening 110 has an upper side 111, a lower side 112 and an access window 113.

The first horizontal direction y extends along the depth, and the second horizontal direction x extends along the width, of the service opening 100. The depth of the service opening 110 extends along the first horizontal direction y, and the access window 113 extends along the second horizontal direction x. For delivering and removing stored goods 102, the service opening 110 is accessible via the access window 113, which faces towards an operator 200.

An indicating device 10 having a bar-shaped lighting device 12 for indicating stored goods 102 is arranged on the upper side 111 of the service opening 110. The lighting elements 14 each emit a light beam 15 that is directed substantially vertically downwards onto the stored goods 102.

Figure 3:
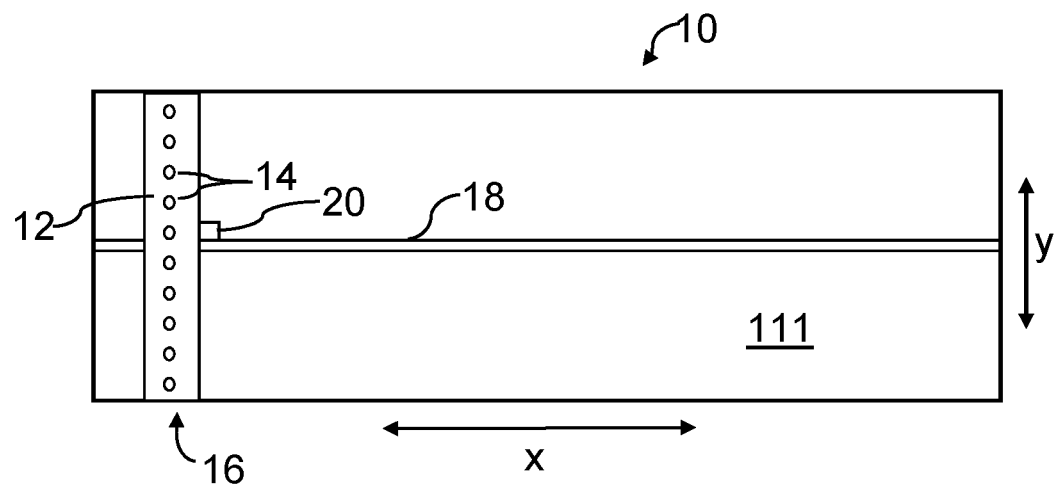
FIG. 3 shows a plan view from below of an inventive indicating device according to a first embodiment.

The structure of the indicating device 10 is described in detail in FIG. 3. Advantageous embodiments of the indicating device 10, which may also be combined with one another, are described by means of FIG. 4 to FIG. 7. The same reference numerals are being used for components of the indicating device 10 shown in FIGS. 3 to 7 that are the same or the same in function.

FIG. 3 shows the indicating device 10 with a lighting device 12. The lighting device 12 has a bar-shaped configuration and extends along the first horizontal direction y. The lighting device 12 has a plurality of lighting elements 14 which are arranged with an offset from one another in a row 16 along the bar-shaped lighting device 12. Along the second horizontal direction x, the lighting device 12 is guided and movable on a rail 18. The rail 18 can be installed on the upper side of the service opening 110, for example, so that the indicating device 10 is located in the upper region of the service opening 110.

The lighting device 12 is moved along the rail 18 by means of a controllable drive unit 20. The drive unit 20 is configured to carry out rapid movements of the lighting device 12, so that characters, for example, can be projected by means of the indicating device onto a surface, such as the lower side 112 of the service opening 110, for instance. A rough sketch of an hourglass, for example, which is used as a symbol for waiting until the stored goods carrier 106 is inserted into the service opening 110, is to be understood to be a character.

The lighting elements 14 can be controlled individually or in groups. It may also be provided that the lighting device 12 emits light in different colors. For example, it may be provided that, in the case of several stored articles stored one behind the other, the desired stored article is indicated with "green", and the articles situated to the front and the rear thereof in space are indicated with "red". Moreover, it may also be indicated in different colors if the stock drops below a minimum level.

Figure 4:
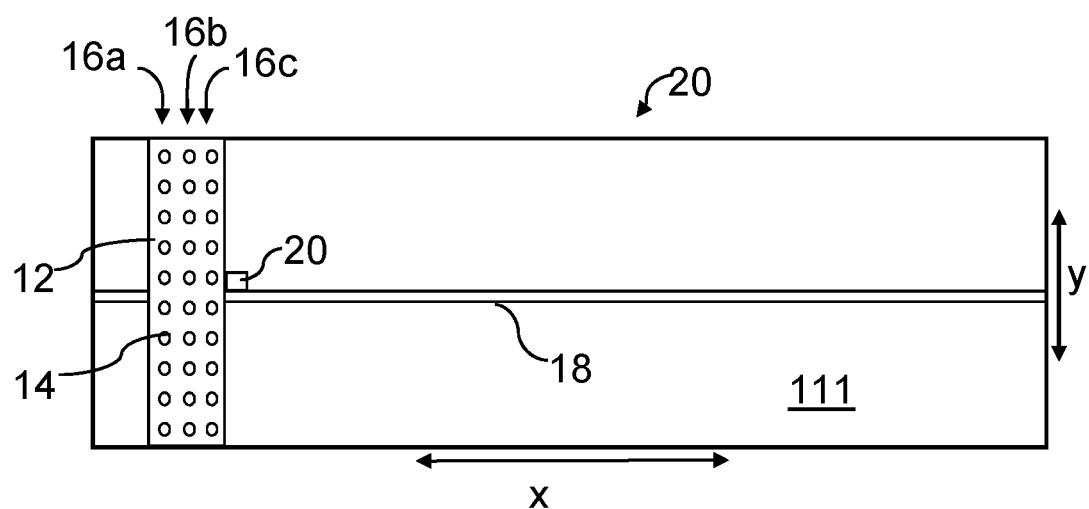
FIG. 4 shows a plan view from below of an indicating device according to a second embodiment.

FIG. 4 shows another indicating device 20, which differs from the indicating device 10 according to FIG. 3 in that the plurality of the lighting elements 14 extends along three rows 16a, 16b, 16c extending side-by-side along the first horizontal direction y.

Figure 5:
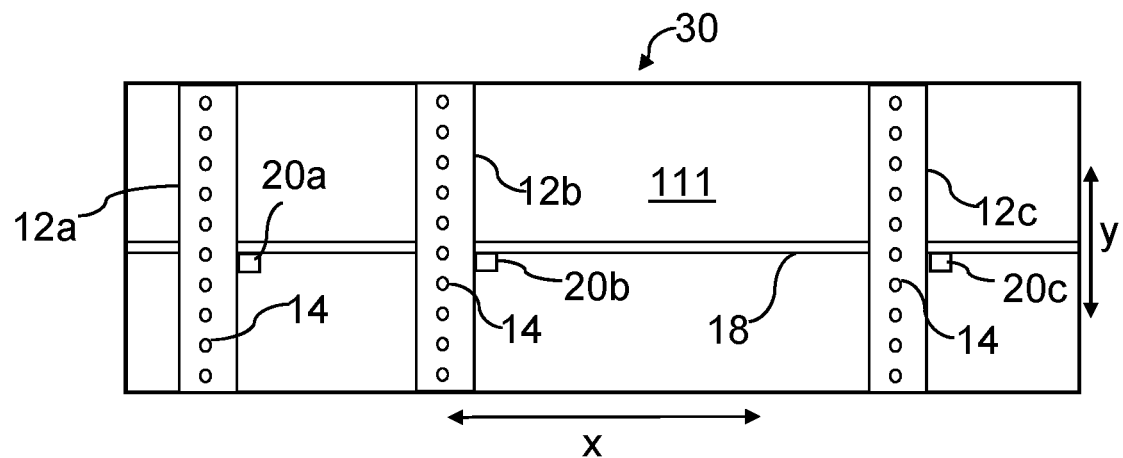
FIG. 5 shows a plan view from below of an indicating device according to a third embodiment.

FIG. 5 shows another indicating device 30, which differs from the indicating device 10 according to FIG. 3 in that several lighting devices 12a, 12b, 12c are arranged to be movable along the second horizontal direction. A first drive unit 20a is assigned to the first lighting device 12a, a second drive unit 20b is assigned to the second lighting device 12b, and a third drive unit 20c is assigned to the third lighting device 12c. The lighting devices 12a, 12b, 12c are separately controllable.

Figure 6:
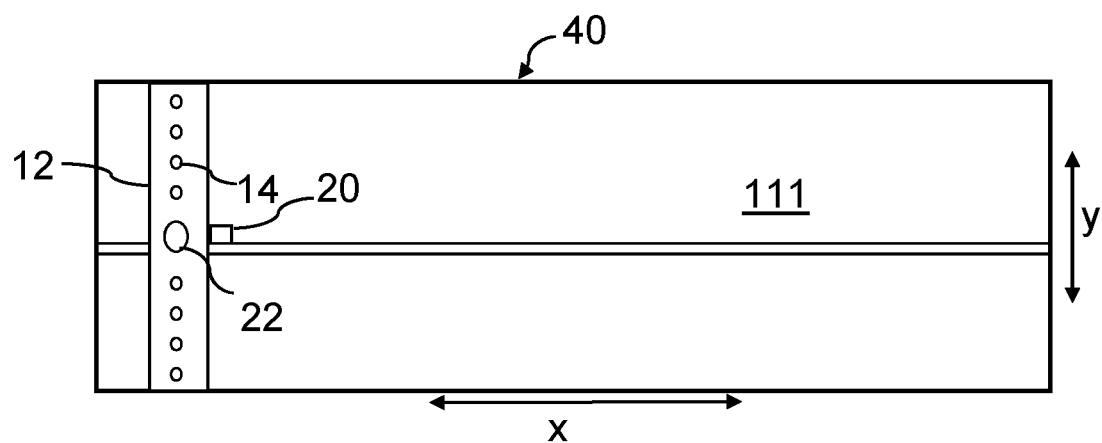
FIG. 6 shows a plan view from below of an indicating device according to a fourth embodiment.

FIG. 6 shows another indicating device 40, which differs from the indicating device 10 according to FIG. 3 in that the lighting device 12 additionally has a camera 22. The field of view of the camera 22 is also directed substantially vertically downwards. Moreover, the camera 22 may have a lens with a fixed focal length, which makes it possible to capture the entire storage rack. In order to record an image, the lighting elements 14 may serve for lighting.

Figure 7:
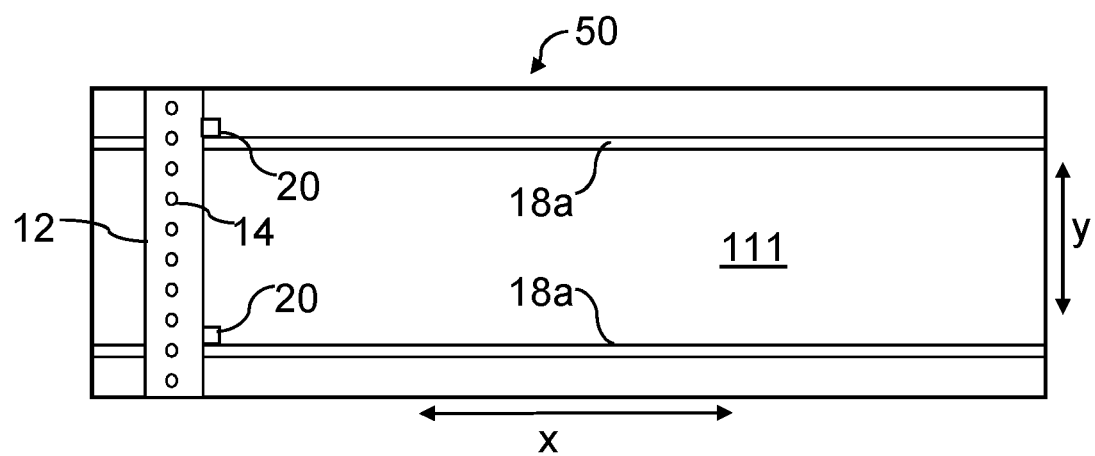
FIG. 7 shows a plan view from below of an indicating device according to a fifth embodiment.

FIG. 7 shows another indicating device 50, which differs from the indicating device 10 according to FIG. 3 in that the lighting device 12 has two rails 18a, 18b. The rails 18a, 18b are positioned in the area of the edge of the lighting device 12.

In order to deliver and retrieve stored goods 102, the operator 200 enters a picking order into a control device. The stored goods carrier 106 with the requested stored goods 102 located on the stored goods carrier 106 is transported to the service opening 110 by means of the transport device 108. Then, the position of the stored goods 102 on the stored goods carrier 106 is indicated to the operator 200 by means of the indicating device 10, via the light beam 15. For this purpose, the lighting device 12 moves along the second horizontal direction x until it is positioned above the storage location of the stored goods 102. Then, only those lighting elements 14 along the first horizontal direction y are activated that are required for indicating the storage location of the stored goods 102 in the depth direction.

Since the lighting elements 14 can be mounted up into the areas of the edges of the lighting devices 12 and the lighting device 12 extends across the entire depth of the stored goods carriers 106 and can be moved along the entire width of the stored goods carrier 106, an exact indication of stored goods 102 on the entire stored goods carrier 106 can be ensured. Even stored goods 102 positioned in areas of the edges of the stored goods carrier 106 can be indicated without being concealed.

The indicating device 10 according to the invention is characterized by a simple and inexpensive structure and versatile applicability. Above all, the subsequent installation in a service opening 110 of a storage rack 100 is possible.

REFERENCE SIGNS LIST

10 Display device
12 Lighting device
14 Lighting element
16 Row
16a First row
16b Second row
16c Third row
18 Rail
20 Drive unit
22 Camera
100 Storage rack
102 Stored goods
104 Carrier supports
106 Stored goods carrier
108 Transport device
110 Service opening
111 Upper side
112 Lower side
113 Access window
y First horizontal direction
x Second horizontal direction

The invention claimed is:

1. A device for indicating stored goods on a stored goods carrier for an automated storage rack, the device comprising at least one lighting device with a plurality of separately controllable lighting elements, wherein the lighting device
is configured in a bar-shaped manner and
has a plurality of lighting elements which are arranged with an offset from one another in a row along the bar-shaped lighting device and are orientated substantially vertically downwards, wherein the lighting device
extends in a first horizontal direction across the entire stored goods carrier, and
wherein the lighting device can be only moved across the entire stored goods carrier in a second horizontal direction.

2. The device according to claim 1, characterized in that the lighting elements are configured as light-emitting diodes (LED) or laser pointers.

3. The device according to claim 1, characterized in that the lighting elements can be controlled individually or in groups.

4. The device according to claim 1, characterized in that the lighting elements are suitable for emitting light in different colors.

5. The device according to claim 1, characterized in that the lighting elements are arranged in at least three rows extending side-by-side.

6. The device according to claim 1, characterized in that the lighting device is guided on at least one rail and can be moved along the rail.

7. The device according to claim 6, characterized in that the lighting device is arranged centrally on the rail.

8. The device according to claim 1, characterized by a controllable drive unit assigned to the lighting device.

9. The device according to claim 1, characterized by multiple bar-shaped lighting devices that can be controlled separately.

10. The device according to claim 1, characterized in that the lighting device has a camera.

11. A storage rack with a device for indicating stored goods on a stored goods carrier, the device comprising at least one lighting device with a plurality of separately controllable lighting elements, wherein the lighting device:
is configured in a bar-shaped manner and
has a plurality of lighting elements which are arranged with an offset from one another in a row along the bar-shaped lighting device and are orientated substantially vertically downwards, wherein the lightning device
extends in a first horizontal direction across the entire stored goods carrier and wherein the lighting device
can be only moved across the entire stored goods carrier in a second horizontal direction.

12. The storage rack according to claim 11, characterized by a plurality of carrier supports disposed one above the other for supporting stored goods carriers that can be transported by means of an automatic transport device, and having at least one service opening for delivering and retrieving the stored goods carriers.

13. The storage rack according to claim 11, characterized in that the device for indicating stored goods is arranged at an upper side of the service opening.

14. The storage rack according to claim 11, characterized in that at least two spaced-apart rack towers are provided, each of which has a plurality of carrier supports for supporting the stored goods carriers, and that the automatic transport device is disposed between the rack towers.

15. The storage rack according to claim 14, characterized in that the first horizontal direction extends along the depth, and the second horizontal direction along the width, of the service opening.

* * * * *